(12) United States Patent
Wagner et al.

(10) Patent No.: US 7,278,331 B2
(45) Date of Patent: Oct. 9, 2007

(54) DRIVE NUT WITH STRUCTURAL EXTRUSION DRIVE AREA FOR VEHICLE SEAT ADJUSTER

(75) Inventors: Alan M Wagner, Sterling Hgts, MI (US); Neil G. Goodbred, Northville, MI (US)

(73) Assignee: Lear Corporation, Southfield, MI (US)

( * ) Notice: Subject to any disclaimer, the term of this patent is extended or adjusted under 35 U.S.C. 154(b) by 602 days.

(21) Appl. No.: 10/604,934

(22) Filed: Aug. 27, 2003

(65) Prior Publication Data

US 2005/0044974 A1    Mar. 3, 2005

(51) Int. Cl.
*F16H 3/06* (2006.01)
(52) U.S. Cl. ..................................... 74/89.23
(58) Field of Classification Search .................. 74/425, 74/89.37, 89.23, 424.71; 296/65.08, 65.15, 296/65.18
See application file for complete search history.

(56) References Cited

U.S. PATENT DOCUMENTS

| | | | | |
|---|---|---|---|---|
| 2,864,431 A | * | 12/1958 | Eaton | 248/393 |
| 4,500,136 A | * | 2/1985 | Murphy et al. | 297/284.9 |
| 4,648,597 A | * | 3/1987 | Adler | 482/61 |
| 4,867,717 A | * | 9/1989 | Burmeister et al. | 440/86 |
| 4,995,580 A | * | 2/1991 | Fujii | 248/421 |
| 5,139,380 A | * | 8/1992 | Reynolds | 411/437 |
| 5,172,601 A | | 12/1992 | Siegrist et al. | 74/89.15 |
| 5,467,957 A | | 11/1995 | Gauger | 248/429 |
| 5,595,363 A | * | 1/1997 | De Leebeeck | 248/72 |
| 5,769,377 A | | 6/1998 | Gauger | 248/429 |
| 5,797,574 A | | 8/1998 | Brooks et al. | 248/398 |
| 2002/0047709 A1 | * | 4/2002 | Fling | 324/326 |
| 2002/0078786 A1 | * | 6/2002 | Zhang et al. | 74/512 |
| 2003/0106978 A1 | | 6/2003 | Garrido | 248/424 |

* cited by examiner

*Primary Examiner*—Richard Ridley
*Assistant Examiner*—Matthew A. Johnson
(74) *Attorney, Agent, or Firm*—Bruce & Harang

(57) ABSTRACT

A drive nut device having a drive nut and a drive nut mounting member formed of a single piece of material eliminating the need to align and fixedly attach a separate drive nut and drive nut mounting member together. The drive nut includes a bore that is threaded during the manufacture of a vertical drive apparatus such that the complete apparatus may be formed by machine.

4 Claims, 2 Drawing Sheets

DRIVE NUT WITH STRUCTURAL EXTRUSION DRIVE AREA FOR VEHICLE SEAT ADJUSTER

BACKGROUND OF INVENTION

1. Field of the Invention

The present invention generally relates to vehicle power seat adjusters, and more particularly to a drive nut device having an integral drive nut incorporated therein for use in vehicle power seat adjusters.

2. Description of the Related Art

Power seat adjusters are a popular component in many automotive vehicles. Such power seat adjusters provide powered horizontal fore and aft adjustment of the vehicle seat. It is also known to provide vehicle power seat adjusters with a vertical or elevation drive mechanism to elevate and lower the seat height as a whole. Separate front and rear seat elevation mechanisms have also been provided to independently as well as simultaneously adjust the elevation of the front and rear edges of a vehicle seat. Power seat recliners have also been incorporated into a vehicle power seat adjuster.

Typically, a vehicle power seat adjuster includes an upper support frame or support members which engage and support the seat bottom of a vehicle seat. The upper support members are mounted on first and second, spaced track assemblies, each formed of an upper track which is connected to the supper support members and which is also slidable mounted in a lower track fixedly anchored to the vehicle floor.

A drive mechanism, typically formed of a bi-directional electric motor mounted between the first and second track assemblies, rotates a pair of drive shafts extending outward from the motor to a separate gear assembly or gearbox mounted on each upper track. The gearbox is connected to a threaded lead screw extending longitudinally between each upper and lower track pair. A drive block or drive nut is fixedly connected to one of the lower or upper tracks threadingly receives the lead screw to effect reciprocal movement of the upper track and the attached upper seat support member upon selective directional energization of the drive motor.

A similar drive motor, gearbox, and threaded lead screw drive has also been utilized for vertical movement of the front and back ends of the upper support members as well as for pivotal movement of the seat back with respect to the seat bottom.

In such vertical drive mechanisms, the drive nut is typically in the form of a cylindrical, metal, tubular member having an internal threaded bore which receives the lead screw. Outwardly extending lugs are carried on one end of the tubular member and pivotally engage apertures or slots formed in a pair of brackets fixedly extending from a torsion tube or bar rotatably mounted between the front or rear ends of the track assemblies. In this manner, rotation of the lead screw causes linear translation of the drive nut which is converted by the drive nut and the mounting brackets into rotation of the torsion tube. Motion links attached to the torsion tube and the seat support member of frame effect vertical elevation or lowering of the front or rear end of the seat support member or frame.

However, the mounting or formation of the lugs on the cylindrical drive nut as well as the precise mounting and configuration of the torsion tube bracket(s), as well as the precise mounting of the drive nut in systems using a fixed drive nut/torsion tube assembly requires close manufacturing tolerances for proper operation.

For example, U.S. Pat. No. 5,797,574 issued Aug. 25, 1998 to Brooks et al. teaches a drive nut device for a vehicle seat adjuster comprising an elongated strap holding a threaded block drive nut.

U.S. Pat. No. 5,769,377 issued Jun. 23, 1998 to Gauger teaches a six way power seat adjustment apparatus using known block type threaded drive nuts mounted in separate holding brackets.

U.S. Pat. No. 5,467,957 issued Nov. 21, 1995 to Gauger teaches an eight way power seat adjustment apparatus using known block type threaded drive nuts mounted in separate holding brackets.

U.S. Pat. No. 5,172,601 issued Dec. 22, 1992 to Siegrist et al. teaches a drive nut having a generally tubular threaded body with a pair of opposing lugs thereon. The lugged tubular threaded drive nut is mounted in a bracket separately formed and separately attached to a seat slide frame member.

U.S. Patent Application Publication Number 2003/0106978 published Jun. 12, 2003 to Garrido teaches a drive nut for mounting in a separate mounting structure both the drive nut and mounting structure having complimentary shapes.

Thus, it would be desirable to provide a drive apparatus for a vehicle power seat adjuster which overcomes certain of the problems encountered with previously devised drive mechanisms. It would also be desirable to provide a drive nut device for a vehicle power seat adjuster which eliminates the need to mount fixedly the drive nut to separate bracket or torsion tube, thereby simplifying the construction, lowering costs, and providing for easy installation in a power seat adjuster.

DISCLOSURE OF THE INVENTION

The present invention provides advantages and alternatives over the prior art by providing a drive nut device in which the threaded bore of the drive nut is formed as an integral part of a drive nut device without the need to separately form the drive nut and drive nut mount and then fixedly attach them in precise alignment. A particularly advantageous embodiment being a vertical drive nut device of the present invention.

According to a further aspect of the present invention, there is presented a drive nut wherein the drive nut portion is formed as an integral part of the drive apparatus by first extruding said drive nut portion, then threading the drive nut bore, and finally forming the drive nut body all within a single multi-stage forming operation.

According to yet another aspect of the present invention a drive nut device comprising a drive nut body having a desired shape and further having two ends. One end having a bore for mounting to a seat movement member and the other end having a drive nut formed as an integral part thereof. Said drive nut having a threaded bore passing through the longitudinal axis of said drive nut.

According to a yet further aspect of the present invention there is provided a process for making a drive nut device having an integral drive nut comprising the steps of extruding a drive nut body in a piece of material having desired dimensions; forming a threaded bore thorough the longitudinal axis of the extruded drive nut step a; and stamping a desired shape into said piece of sheet steel, thereby forming a drive nut device for use in the movement apparatus of a power seat adjuster.

According to a yet still further aspect of the present invention there is provided a drive nut device in which the thickness of the drive nut body is increased from about 50 percent to about 85 percent of the nominal thickness of the device sheet steel thickness.

The present invention thus advantageously provides a unique drive nut device for a power seat adjuster which is simple to manufacture, easy to install in a power seat adjuster and eliminates the requirement of time-consuming costly alignment and attachment steps for mounting the drive nut on the drive nut device.

DETAILED DESCRIPTION

Figure 1:
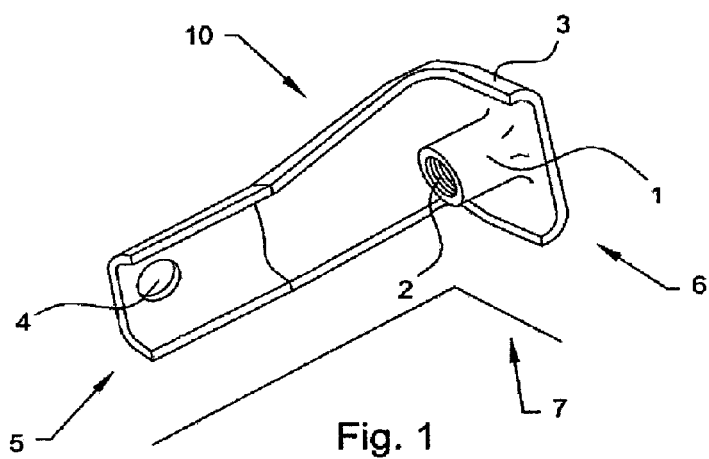
FIG. 1 shows a perspective view of one preferred embodiment of the vertical drive nut device of the present invention.

Reference will now be made to the drawings, wherein to the extent possible like reference numerals are utilized to designate like components throughout the various views. The present invention will now be illustrated by describing a preferred embodiment of a vertical drive nut device. It is to be understood that the present invention also encompasses horizontal drive nut devices. Referring to FIG. 1, which presents a perspective view of the vertical drive nut device 10 having a generally L-shape shown by line 7 of the present invention having a drive nut 1 formed as an integral part of drive nut body 3 at second end 6.

Figure 2:
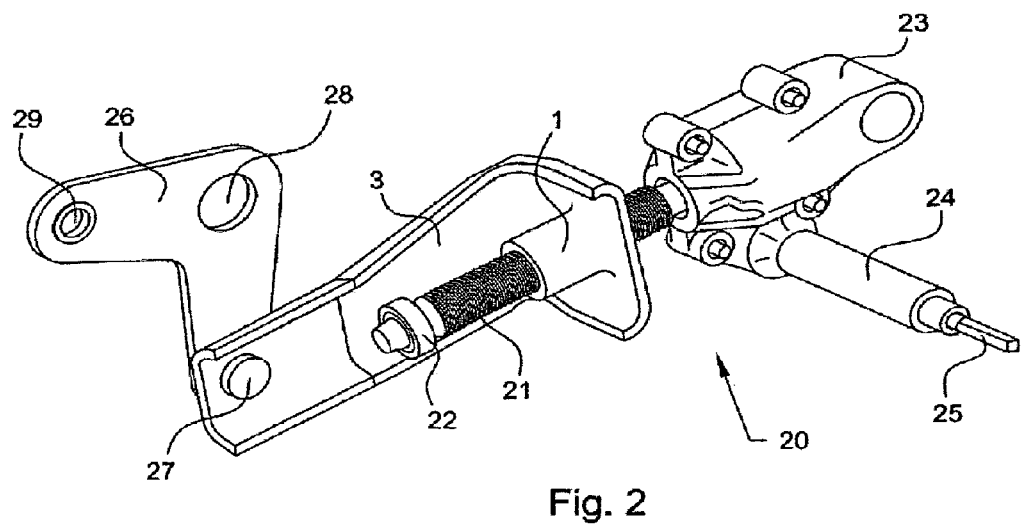
FIG. 2 shows a perspective view of the vertical drive nut device of FIG. 1 with a lead screw, gearbox, and seat mount attached thereto.

FIG. 1 further shows the drive nut 1 having a threaded bore 2 through the drive nut 1 along the longitudinal axis of drive nut 1 said drive nut 1 being located at second end 6 of said drive nut device 10, and mounting bore 4 located at a desired location on the drive nut body 3 at the first end 5 of said drive nut device 10 to allow the vertical drive nut device to be mounted to an appropriate vertical seat movement lever 26 (FIG. 2). Preferably, the drive nut 1 is formed as a first stage of a multi-stage forming process by known extrusion processes, most particularly by known structural type extrusion. Then the bore 2 is threaded by known bore threading means to have a thread complimentary to the thread on the lead screw 21 (FIG. 2). Finally, the drive nut body 3 and mounting bore 4 are formed as part of the multi-stage forming process. It is to be appreciated that while this is the presently preferred sequence of production, these production steps may be interchanged without departing from the scope and spirit of the present invention. The most preferred extrusion process provides for increasing the wall thickness of the drive nut 1 by from about 50 percent to about 85 percent of the nominal material thickness in the drive nut 1 extruded wall area.

Figure 3:
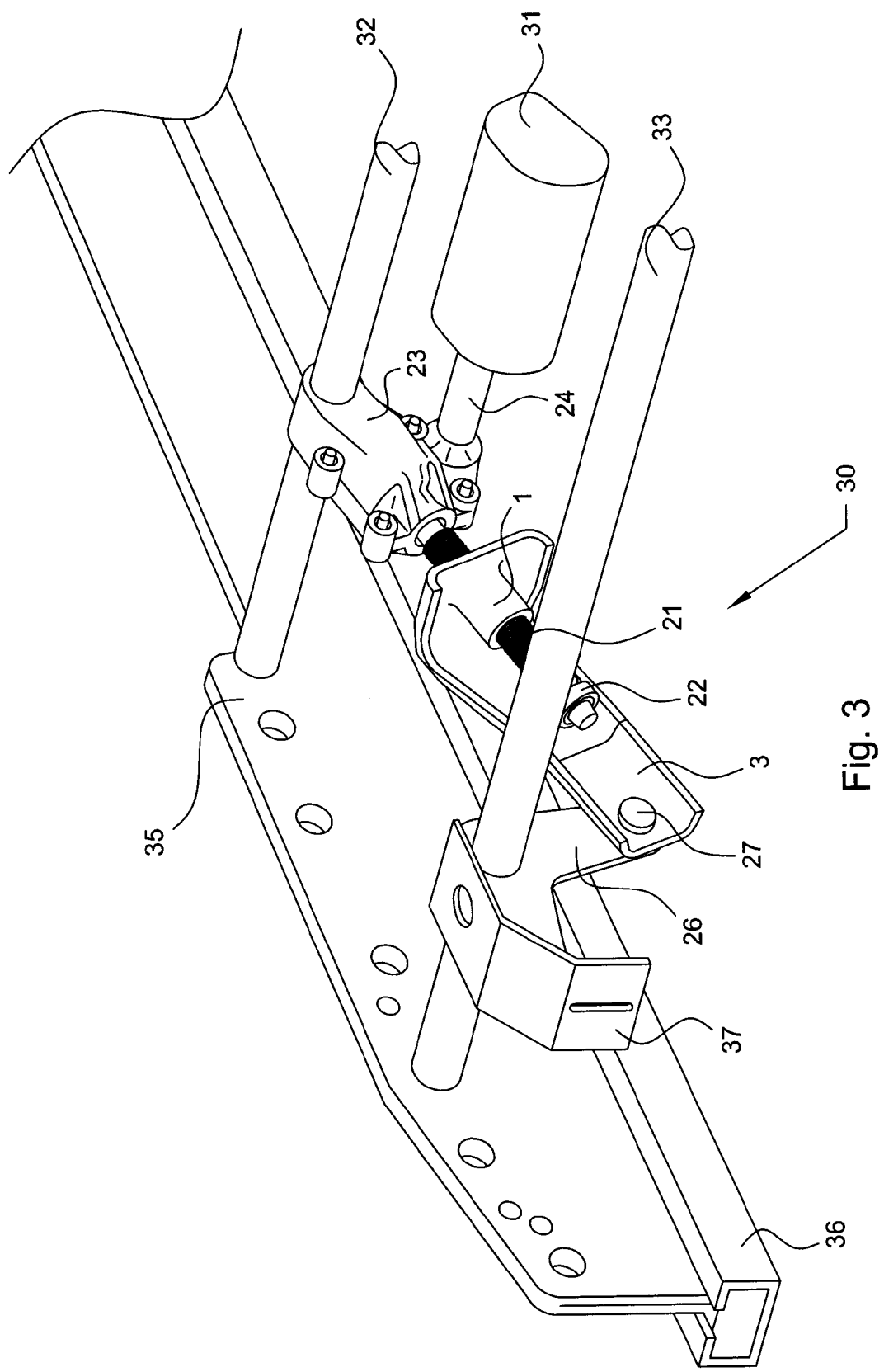
FIG. 3 shows a perspective section view of the preferred embodiment of the vertical drive nut device of FIG. 1 mounted on a typical vehicle motorized seat track.

Referring now to FIG. 2, there is shown a perspective view of one preferred embodiment the vertical drive nut device 10 of the present invention being a part of a seat movement unit 20 showing the a typical mounting of the vertical drive nut device 10 drive nut 1 to a threaded lead screw 21 having a movement stop 22 attached to one end of said threaded lead screw 21 and the other end attached to a gearbox 23. Gearbox 23 having a motor connecting gearbox shaft 24 attached thereto and the motor connecting gearbox shaft 24 having a connecting portion 25 on the opposite end for connecting to a motor 31 (FIG. 3). Further shown is a seat movement lever 26 moveably fixed to drive nut body 3 through bore 4 by fastener 27. Fastener 27 may be any suitable well known in the art such as, for example, bolts, rivets, shoulder bolts, and the like. Seat movement lever 26 also having a bore 28 for rotationally mounting said seat movement lever 26 on a support member 33 (FIG. 3) and a bore 29 for mounting a seat mount 37 (FIG. 3) thereto.

Turning now to FIGS. 3, there is shown the perspective view of the preferred embodiment of the vertical drive nut device 10 of FIG. 1 with the gearbox 23, threaded lead screw 21 and seat movement lever 26 mounted as in FIG. 2 all mounted on a portion of a typical support frame and frame track assemblies commonly used and understood in the art. There is shown mounting members 32 and 33 for mounting the gearbox 23 and the seat movement lever 26 as well as a motor 31 mounted to the motor connecting gearbox shaft 24 as well as a seat bottom mount 37 mounted to seat movement lever 26. The motor 31, gearbox 23, vertical drive nut device 3 and seat mount 37 all connected via mounting members 32 and 33 to support frame 35 in turn mounted to the top track of a moveable track assembly 36.

As is well known in the art, the rotational movement of the motor 31 armature causes rotational movement in the motor connecting gearbox shaft 24. The gearbox 23 then changes the direction of the rotational movement to the threaded lead screw 21. The rotational movement of the threaded lead screw 21 in the drive nut 1 of vertical drive nut device 3 produces a linear movement along the longitudinal axis of the threaded lead screw 21 and thereby linear movement of the vertical drive nut device 3. This linear movement of vertical drive nut device 3 by way of the moveable connecting fastener 27 connecting vertical drive nut device 3 to seat movement lever 26 around seat movement lever bore 28 on mounting member 33 causing vertical movement of seat mount 37 thereby vertically moving the front or back edge of a seat cushion (not shown).

The various parts of such seat adjusters are well known as well as suitable materials to make such parts such as, for example, sheet steel, and plastic. The drive nut device may also be made of any suitable material well known in the art such as, for example, 1080/1010 hot or cold rolled steel. Particularly preferred is sheet steel and most particularly sheet steel having a thickness of from about 0.5 mm to about 4.0 mm.

Although the preferred embodiments of the present invention has been disclosed, various changes and modifications may be made without departing from the scope of the invention as set forth in the appended claims.

The invention claimed is:

1. A drive nut device for use in allowing positional movement of a vehicle seat comprising:

a one-piece sheet steel drive nut body having a generally L-shape and further having a first end and a second end;

said first end having a bore for mounting to a seat movement member;

and said second end having a cantilevered extruded drive nut formed as part of the one-piece drive nut body, said cantilevered drive nut further characterized as having a wall thickness of about 50 percent to about 85 percent greater than the nominal thickness of said one-piece drive nut body, said cantilevered drive nut having a threaded bore passing through a longitudinal axis of said cantilevered drive nut and further having a longitudinal length predetermined to prevent undesired non-longitudinal axis movement of said drive nut device.

2. The drive nut device as claimed in claim 1 wherein, said sheet steel is from about 0.5 mm to about 4.0 mm thick.

3. A vertical drive nut for use in allowing vertical positioning of a vehicle seat device comprising:
- a one-piece sheet steel drive nut body having a generally L-shape and further having a first end and a second end;
- said first end having a bore for mounting to a seat vertical movement member;
- and said second end having a cantilevered extruded drive nut formed as part of the one-piece drive nut body, said cantilevered drive nut further characterized as having a wall thickness of about 50 percent to about 85 percent greater than the nominal thickness of said one-piece drive nut body, said cantilevered drive nut having a threaded bore passing through a longitudinal axis of said cantilevered drive nut at substantially a right angle to said bore for mounting to the seat vertical movement member, said cantilevered drive nut further having a longitudinal length predetermined to prevent undesired non-longitudinal axis movement of said drive nut device.

4. The vertical drive nut device as claimed in claim 3 wherein, said sheet steel is from about 0.5 mm to about 4.0 mm thick.

* * * * *